March 2, 1926.
E. W. BREYLEY
1,575,411
CONNECTED FRICTION CAR STOP SHOE
Filed Jan. 21, 1924
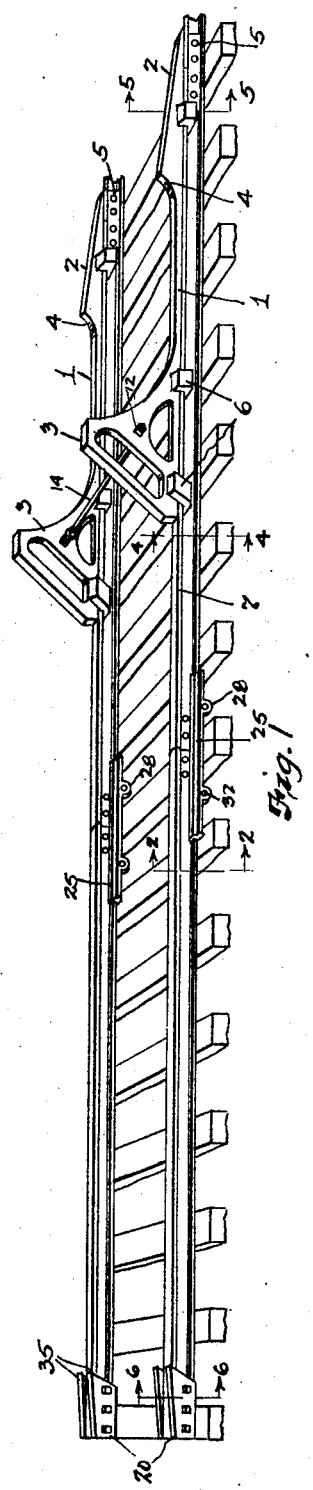
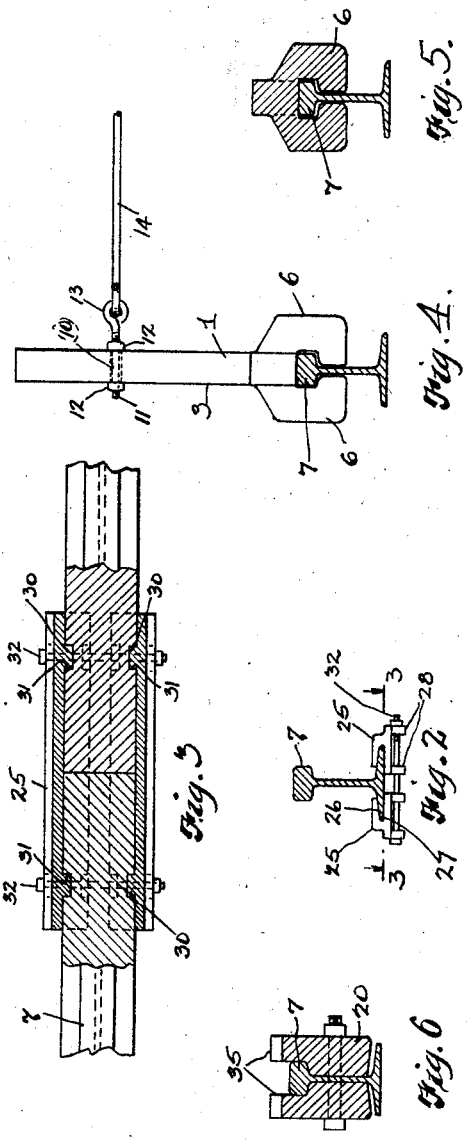
INVENTOR.
Edward W. Breyley
BY
Fay, Oberlin & Fay
ATTORNEYS Patented Mar. 2, 1926.

1,575,411

UNITED STATES PATENT OFFICE.

EDWARD W. BREYLEY, OF CLEVELAND, OHIO, ASSIGNOR TO THE FRICTION CAR STOP COMPANY, OF CLEVELAND, OHIO, A CORPORATION OF OHIO.

CONNECTED FRICTION CAR STOP SHOE.

Application filed January 21, 1924. Serial No. 687,442.

*To all whom it may concern:*

Be it known that I, EDWARD W. BREYLEY, a citizen of the United States, and a resident of Cleveland, county of Cuyahoga, and State of Ohio, have invented a new and useful Improvement in Connected Friction Car Stop Shoes, of which the following is a specification, the principle of the invention being herein explained and the best mode in which I have contemplated applying that principle, so as to distinguish it from other inventions.

The present invention relates to friction shoes for stopping railway cars, and more particularly to means for connecting a pair of shoes together. Such connecting means provides for limited independent movement of the two shoes and prevents the tendency of the shoes to tip or spread outwardly and also maintains the shoes in relative alignment. New means for connecting rail ends together is also shown so as to give an extra length of rail free from the usual fish plates. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a perspective view of a section of track with a pair of connected shoes mounted thereon; Fig. 2 is a sectional view on the line 2—2 of Fig. 1; Fig. 3 is a sectional view on the line 3—3 of Fig. 2; Fig. 4 is a sectional view through the rail on the line 4—4 of Fig. 1, but showing the shoe in elevation; Fig. 5 is a sectional view on the line 5—5 of Fig. 1; and Fig. 6 is a sectional view through the stop taken on the line 6—6 of Fig. 1.

The present shoes 1 are similar in construction to those shown in issued U. S. Patents Nos. 1,276,023 and 1,385,528 issued to Breyley and Duffy and to James U. Duffy, respectively, which show friction shoes of the type returnable by movement of the car wheel. These shoes comprise an inclined forward portion 2, spaced away from a high rear portion 3, having its forward face curved to fit the car wheel, the space being sufficient to allow both car wheels to ride on the shoe. At the end of the inclined portion the shoe drops down to provide the hump 4 which engages with the car wheel to return the shoe to its forward or car receiving position where the shoe engages with the rail fish plate 5 to prevent further forward movement. These shoes are provided with a plurality of legs 6 which embrace and extend under the rail head 7, as best shown in Figs. 4 and 5, and thus maintain the shoe in an upright position.

In use there has been a tendency for the shoes to spread apart or tip over outwardly and to maintain the correct gauge or distance apart at the top, the present pair of shoes has been connected together. For this purpose each shoe is provided with a suitable aperture 10, in which is mounted a bolt 11, having a nut 12 on each side of the shoe and provided with an eye 13 on the inside end. Connecting these two eye-bolts is a rod 14, with an eye 15 on each end interengaged with the eyes on the bolts. As the position of the eye-bolts 11 may be adjusted, the type of the shoes may be moved slightly, but normally the rod 14 does not hold the shoes in position. When the shoes tend to tip the rod prevents their spreading and the gauge of the shoes is thus maintained correctly. By use of the eye-bolts and the eyed rod a limited universal action is secured so that the shoes may move slightly along the track relative to each other. The shoes are not rigidly interconnected but the connection is capable of limited play and movement in any direction.

At the back end of each rail is mounted a stop 20 adapted to be contacted by the rear legs of each shoe, as in the forms previously shown and described in the patents mentioned. To give a long track for the shoes to slide on the usual fish plates between the rail ends may be dispensed with and thus any desired length of track may be employed. The fish plates between the forward shoe position and the stops are removed and in place thereof the rail ends are connected by means of clamping members 25.

These members 25 are provided with a groove or channel 26, adapted to receive the base flange 27 of the rails, and are also provided with downwardly extending apertured lugs 28, a pair of lugs being formed near each end of the clamp member. Each member is also provided with a pair of lugs 30 extending into the channel 26, and the base flange of the rail is notched or cut away as at 31 to receive these lugs 30. The clamp members are placed in position with the lugs 30 engaged in the notches 31, thus holding the rail ends together against any possible independent longitudinal movement, and clamping bolts 32 are passed through the apertures in the lugs 28. These bolts clamp the members tightly to the rail base and hold the locking lugs 30 in position, thus securing the rail ends together, but leaving the rail head and the upper portion of the web of the rail free and allowing the shoes to pass over the joint.

The stop member comprises two portions 35 bolted through the web, the forward face of the stop being inclined to engage with the complementary face of the rear legs on each shoe.

By the present structure it has been found possible to hold the shoes together, and prevent tipping, due either to car sway or wear of the rail head. The new clamping members for the rail ends make it possible to fit the shoe legs closely about the rail head and yet allow for any desired distance of travel along the rail for the shoes.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a car stop, the combination of a pair of wheel receiving shoes slidably mounted on the rails, stops on said rails and adapted to limit movement of said shoes in both directions, said shoes being adapted to be moved in both directions by said car wheels until engaging said stops, and means connecting said two shoes, said means being adjustable to maintain the correct gauge between said shoes, said means also providing for slight independent shoe movement.

2. In a car stop, the combination of a pair of wheel receiving shoes slidably mounted on the rails, stops on said rails and adapted to limit movement of said shoes in both directions, said shoes being adapted to be moved in both directions by said car wheels until engaging said stops, an eye-bolt adjustably mounted on each shoe above the level of the rail, and an eyed rod connected to said bolts.

Signed by me this 12th day of January, 1924.

EDWARD W. BREYLEY.